United States Patent
Gueller et al.

(10) Patent No.: US 11,241,704 B2
(45) Date of Patent: Feb. 8, 2022

(54) SPRAYING PROCESS FOR COATING A SUBSTRATE

(71) Applicant: Chemspeed Technologies AG, Fullinsdorf (CH)

(72) Inventors: Rolf Gueller, Herznach (CH); Carine Marcos, Bartenheim (FR); Elisabeth Neugebauer, Grenzach-Wyhlen (DE)

(73) Assignee: Chemspeed Technologies AG, Fullinsdorf (CH)

( * ) Notice: Subject to any disclaimer, the term of this patent is extended or adjusted under 35 U.S.C. 154(b) by 134 days.

(21) Appl. No.: 16/344,940

(22) PCT Filed: Nov. 6, 2017

(86) PCT No.: PCT/CH2017/000095
§ 371 (c)(1),
(2) Date: Apr. 25, 2019

(87) PCT Pub. No.: WO2018/085950
PCT Pub. Date: May 17, 2018

(65) Prior Publication Data
US 2019/0270102 A1    Sep. 5, 2019

(30) Foreign Application Priority Data
Nov. 8, 2016    (CH) .................................... 01481/16

(51) Int. Cl.
*B05B 7/08*    (2006.01)
*B05D 1/02*    (2006.01)
(Continued)

(52) U.S. Cl.
CPC .......... *B05B 7/0807* (2013.01); *B05B 7/0075* (2013.01); *B05B 7/0853* (2013.01);
(Continued)

(58) Field of Classification Search
None
See application file for complete search history.

(56) References Cited

U.S. PATENT DOCUMENTS 2,261,279 A * 11/1941 Pellar .................... B05B 7/0815
239/290
3,593,680 A *  7/1971 Paasche .............. B05B 13/0207
118/685
(Continued)

FOREIGN PATENT DOCUMENTS

CN         2347673 Y    11/1999
CN       101448575 A     6/2009
(Continued)

OTHER PUBLICATIONS

Emmerich, Roland. Abstract of "Experience with Automated Development and Spray Application of Coatings". Posters Coatings Science International 2010. (Year: 2010).*
(Continued)

*Primary Examiner* — Alexander M Weddle
(74) *Attorney, Agent, or Firm* — The Webb Law Firm

(57) ABSTRACT

In a spraying process for coating a substrate with a substance atomised in a stream of gas, a spray head is used to generate a stream of gas that acts upon the substrate. The substance is present in a syringe-like application container equipped with an application tip. The application tip of the application container containing the substance is introduced into the stream of gas outside the spray head at a distance therefrom and transversely with respect to the main direction of flow of the stream of gas, and the substance is introduced from the application container into the stream of gas at that location.

20 Claims, 8 Drawing Sheets

(51) Int. Cl.
B05B 7/00 (2006.01)
B05B 12/00 (2018.01)
B05B 13/04 (2006.01)
B25J 11/00 (2006.01)
B44D 3/00 (2006.01)
B05B 15/80 (2018.01)
G01J 3/00 (2006.01)
B05B 14/43 (2018.01)

(52) U.S. Cl.
CPC .......... *B05B 12/00* (2013.01); *B05B 13/0431* (2013.01); *B05B 15/80* (2018.02); *B05D 1/02* (2013.01); *B25J 11/0075* (2013.01); *B44D 3/003* (2013.01); *G01J 3/00* (2013.01); *B05B 14/43* (2018.02)

(56) References Cited

U.S. PATENT DOCUMENTS

| | | | | |
|---|---|---|---|---|
| 4,606,501 | A | * | 8/1986 | Bate .................. B05B 7/2429 239/346 |
| 4,864,966 | A | * | 9/1989 | Anderson ............... B05B 12/14 427/265 |
| 5,255,852 | A | * | 10/1993 | Morrison .............. B05B 7/2429 239/346 |
| 6,267,300 | B1 | | 7/2001 | Venema |
| 8,544,410 | B2 | | 10/2013 | Tanioka et al. |
| 9,149,821 | B2 | | 10/2015 | Micheli et al. |
| 9,452,439 | B2 | | 9/2016 | Bolton |
| 2005/0025895 | A1 | | 2/2005 | Takeuchi |
| 2008/0012159 | A1 | | 1/2008 | Schmid et al. |
| 2012/0156825 | A1 | * | 6/2012 | Lewis ................. H01L 51/0023 438/73 |
| 2014/0332606 | A1 | | 11/2014 | Asakawa et al. |
| 2015/0042716 | A1 | * | 2/2015 | Beier .................. B41J 11/0022 347/14 |

FOREIGN PATENT DOCUMENTS

| | | | | |
|---|---|---|---|---|
| CN | 203777368 | U | 8/2014 | |
| CN | 104039460 | A | 9/2014 | |
| DE | 3417229 | A1 | 11/1985 | |
| DE | 4417709 | A1 | 11/1995 | |
| DE | 102014104341 | A1 | 10/2015 | |
| EP | 0092359 | A2 | 10/1983 | |
| EP | 2218513 | A1 | 8/2010 | |
| EP | 2218513 | A1 | * 8/2010 | ............... B05B 5/03 |
| JP | H24649 | U | 1/1990 | |
| JP | H330853 | A | 2/1991 | |
| JP | H4247252 | A | 9/1992 | |
| JP | H6238001 | A | 8/1994 | |
| JP | 2002282745 | A | 10/2002 | |
| JP | 200566593 | A | 3/2005 | |
| WO | 2009060898 | A1 | 5/2009 | |
| WO | 2013134552 | A2 | 9/2013 | |

OTHER PUBLICATIONS

Emmerich et al., "Experience with Automated Development and Spray Application of Coatings", Bosch Lab Systems, 1 page, Waiblingen, Germany, accessed Nov. 6, 2014.
"Innovation for your paint laboratory", Bosch Lab Systems, 2 pages, Waiblingen, Germany, accessed Nov. 6, 2014.
Du Shaoyan et al., "Automobile Manufacturing Process", Aviation Industry Press, Aug. 2015, pp. 225-226.
Shide et al., "Higher Mechanical CAD/CAM", Southwest Jiaotong University Press, Jan. 2015, pp. 174-176.

* cited by examiner

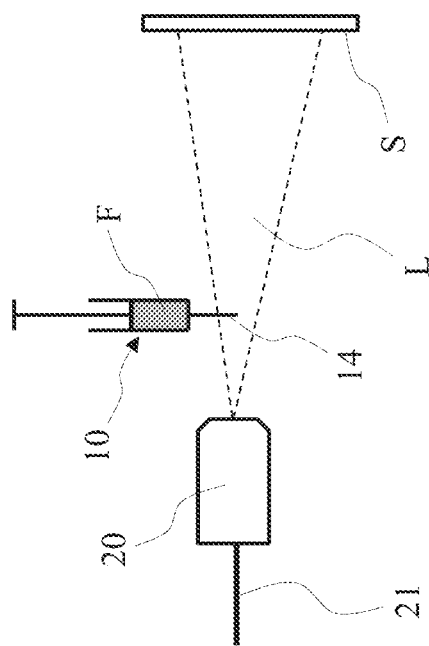
Fig. 1c
Fig. 1d
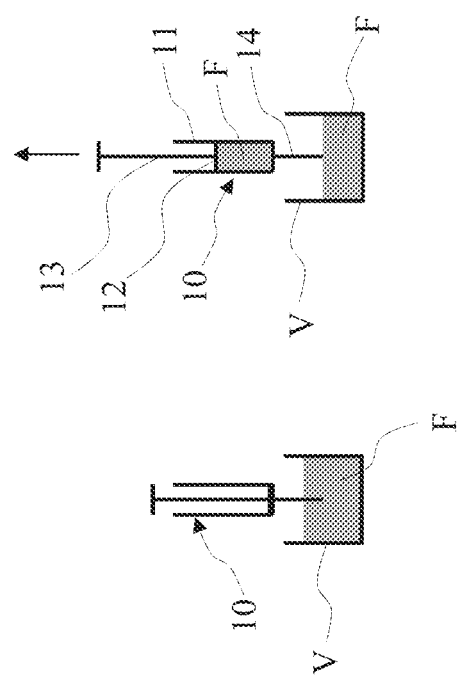
Fig. 1a
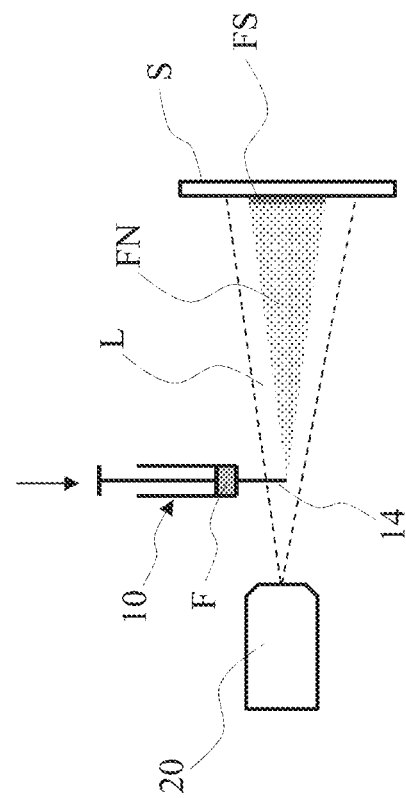
Fig. 1b

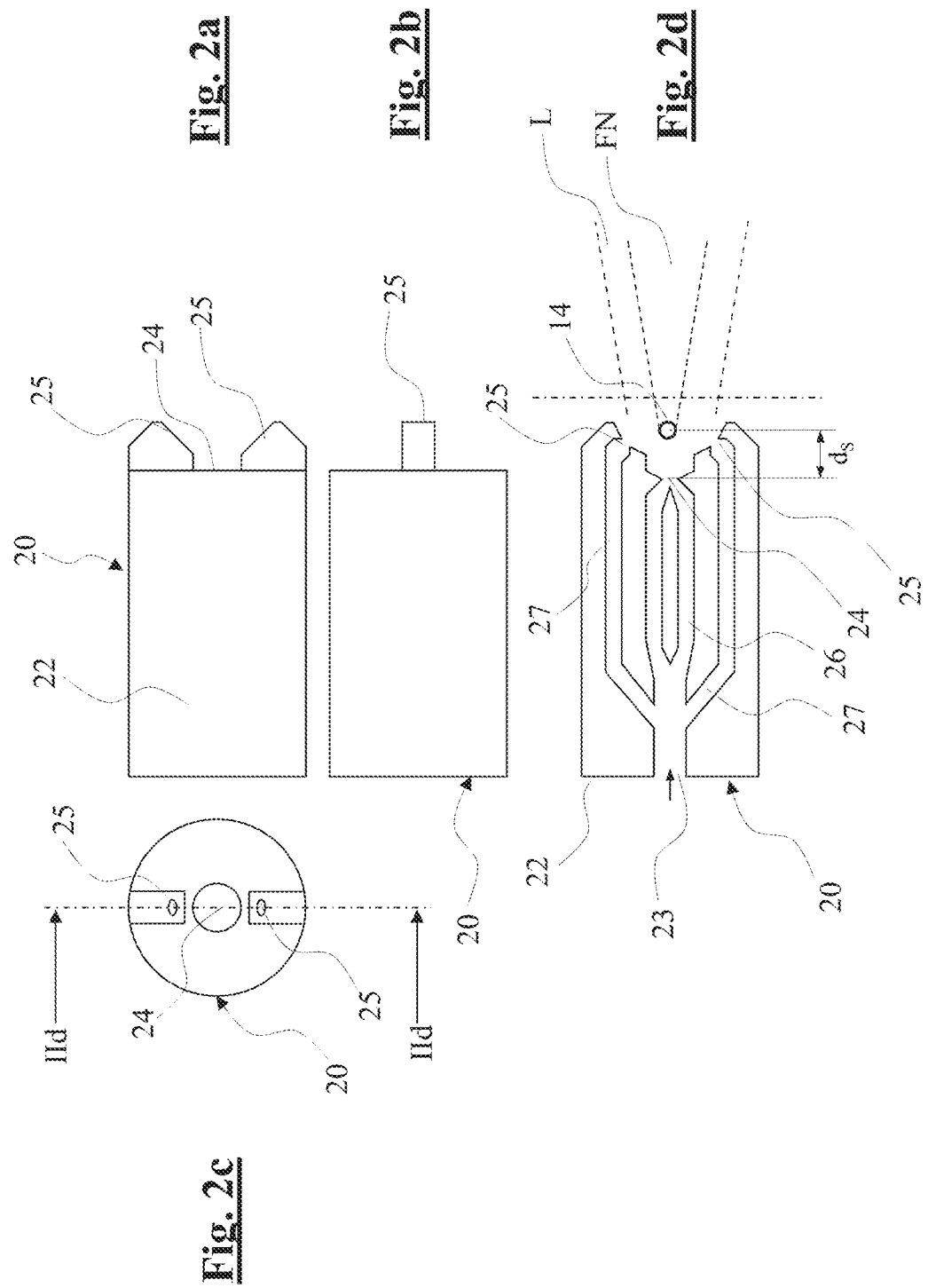

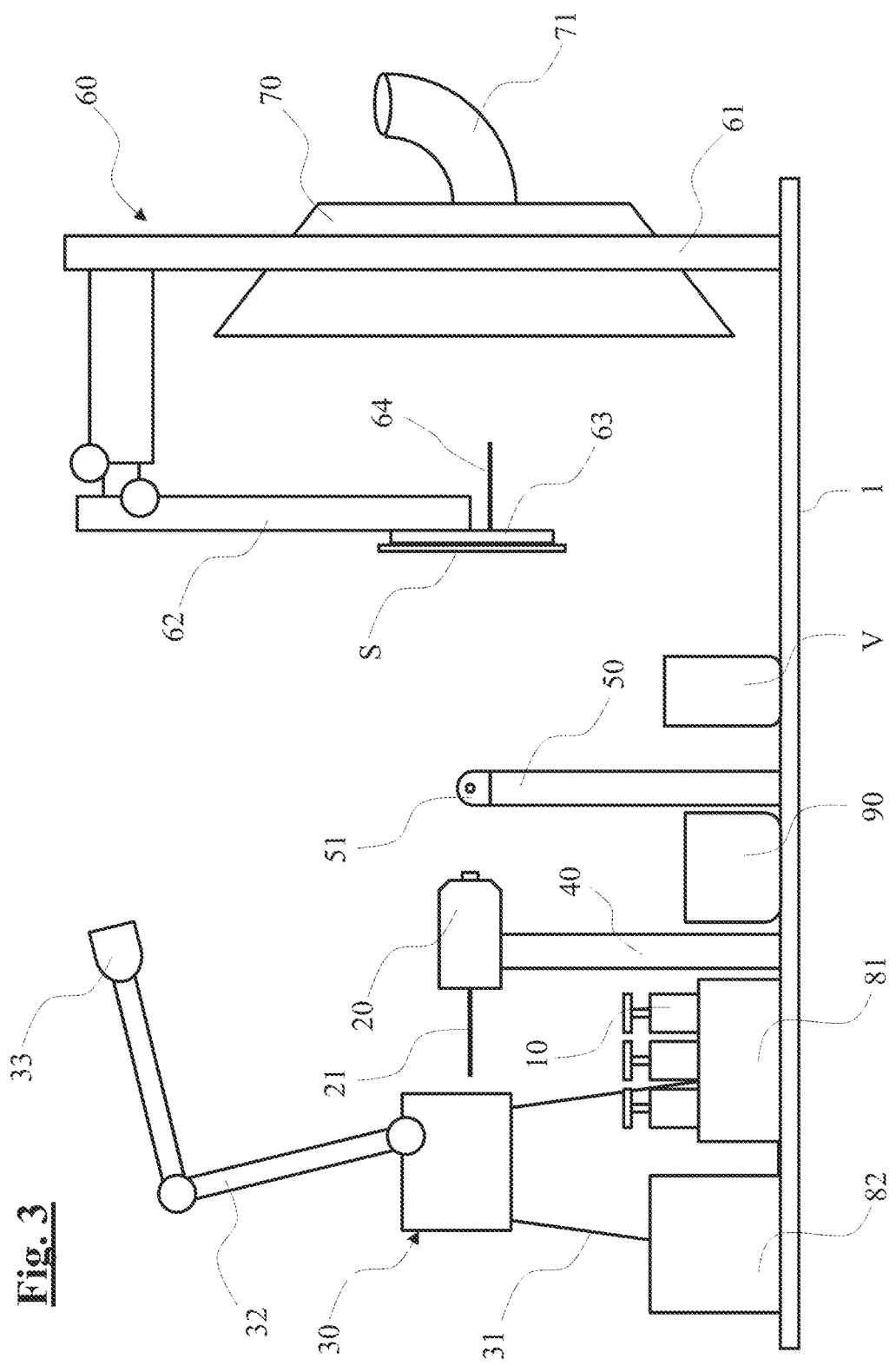

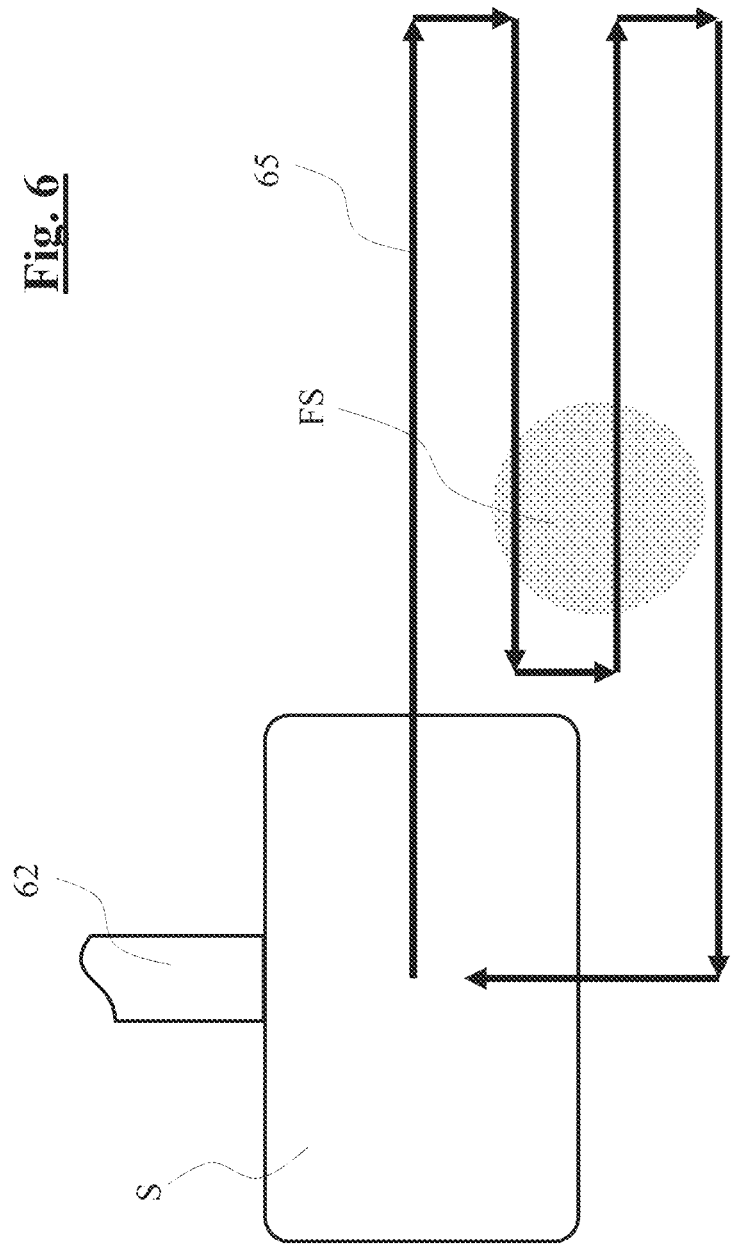

SPRAYING PROCESS FOR COATING A SUBSTRATE

CROSS-REFERENCE TO RELATED APPLICATIONS

This application is the United States national phase of International Application No. PCT/CH2017/000095 filed Nov. 6, 2017, and claims priority to Switzerland Patent Application No. 01481/16 filed Nov. 8, 2016, the disclosures of which are hereby incorporated by reference in their entirety.

BACKGROUND OF INVENTION

Field of the Invention

The present invention relates to a spraying process for coating a substrate and a spray device suitable for carrying out the process.

Technical Considerations

An important step during the testing of, for example, paints or paint formulations, but also, for example, adhesives and adhesive formulations, during their development is the application of the paint or adhesive sample produced to a test substrate. A sample is applied to the test substrate using a desired method and then, directly or after a drying phase, tested or measured in accordance with desired criteria (abrasion tests, colorimetry, chemical and physical resistance tests etc.).

As test substrate there are customarily used standard plates made of metal (for example plates made of steel or aluminium), cardboard, wood, glass or plastics. A widely used method for applying the sample or for coating the test substrate with the sample is a spraying process in which the sample is atomised in a stream of air and the resulting droplets of paint or adhesive are deposited or finely distributed on the substrate.

Comprehensive test series with different samples are often carried out in the course of the development of paints and adhesives. During such testing it is essential that, with each change of sample, the parts of the spray device used that come into contact with the sample be cleaned. The cleaning of the spray device etc. is often very laborious and requires comparatively more time than does the actual spraying operation. In order to apply and test a large number of different samples in the shortest possible time it is important that the necessary process of cleaning the application device be kept as uncomplicated and short as possible and also that the use of large amounts of cleaning agents and solvents be reduced, because both the acquisition and especially the disposal of the cleaning agents and solvents give rise to considerable cost and, in addition, are harmful to the environment.

A spray device requiring a reduced amount of cleaning is described in US 2008/0012159 A1.

The spray device has a compressed-air-fed spray head (as in the case of conventional spraying methods) which has an axial main nozzle and two horn jet nozzles and generates a substantially conical stream of air. An application container of syringe-like construction is introducible axially into the stream of air generated by the spray head, which application container has previously picked up a substance (paint sample) to be sprayed. The application container is equipped with a cannula-like tip which projects through the axial main nozzle of the spray head when the application container is installed in the spray head and has its mouth outside the spray head or rather the main nozzle thereof. By means of, for example, motor-controlled advancement of the syringe plunger of the application container, the substance can be introduced through the tip of the application container into the stream of air generated by the spray head, the substance then being atomised or nebulised in the stream of air. By the use of a separate application container, the substance being sprayed does not come into contact with the spray head, so that there is no need to clean the spray head after each change of substance/sample. The syringe-like application container itself requires only a comparatively small amount of cleaning or can also be in the form of a single-use container and discarded after each use.

Although the spray device known from US 2008/0012159 A1 basically solves the cleaning problem in such spray-coating processes, it does have various other disadvantages. Since the application containers are inserted into the spray head, the spray head and the application containers must be matched to one another structurally. That is to say, it is not possible to use any commercially available spray head in combination with any commercially available application container. Furthermore, the insertion and removal of the application containers requires a relatively large amount of manipulation. And, finally, particularly the insertion of the application containers into the spray head and their subsequent removal therefrom constitute a not insignificant risk of contamination which in some circumstances may still necessitate cleaning of the spray head.

EP 2 218 513 A1 discloses a spray device for electrostatic charging and injection of a sample solution into a stream of gas. A syringe (application container) containing the sample solution is arranged in front of the outlet of a gas pipe. The gas flowing out of the gas pipe causes the sample solution expelled from the syringe to be atomised and applied to a substrate. Optionally, means for aligning the relative position between the gas pipe and the outlet from the application container can be provided.

Whatever the method used for filling the application container with sample solution, it is also possible for that spray device to become contaminated with sample solution which could then, for example, fall onto the spray head or, on start-up of the stream of gas, be swept out of the application container thereby and deposited on the substrate in an uncontrolled way.

An objective of the present invention is now to provide an improved spraying process which avoids the described disadvantages of the known processes and spray devices used therefor. More specifically, an objective is to improve a spraying process of the generic kind to the effect that contamination of the spray head with the substance being sprayed is reliably avoided and that the process is easy to handle and economically realisable in terms of apparatus and can be carried out using commercially available spray heads and application containers well established in the sector.

The problem underlying the invention is solved by the spraying process as described herein and by the spray device as described herein.

In respect of the spraying process, the core of the invention lies in the following: in a spraying process for coating a substrate with a substance atomised in a stream of gas, a spray head is used to generate a stream of gas that acts upon the substrate. The substance is present in a syringe-like application container equipped with an application tip and, without contact with the spray head, is introduced from the application container into the stream of gas and thereby atomised. The application tip of the application container containing the substance is introduced into the stream of gas outside the spray head at a (small) distance therefrom and transversely with respect to the main direction of flow of the stream of gas (centrally, i.e. axially), and the substance is introduced from the application container into the stream of gas at that location.

Introducing the application container, or rather the application tip thereof, laterally into the stream of gas outside the spray head, on the one hand reliably avoids any kind of contamination of the spray head. In particular, any droplets of substance adhering to the outside of the application tip during the introduction of the application tip into the existing stream of gas are blown away by the latter before they are able to fall onto the spray head. On the other hand, any combinations of commercially available spray heads and application containers can be used independently of one another. Furthermore, the introduction of the application container, or rather the application tip thereof, into the stream of gas and its removal from the stream of gas are relatively simple in terms of handling.

A further advantage of the spraying process according to the invention is that the metering speed of the substance to be atomised can be varied independently of the speed of the stream of gas.

In accordance with an advantageous embodiment, a disposable syringe or a disposable pipette can be used as application container, with the result that no cleaning whatsoever is required when the substance is changed.

Advantageously the application container with the application tip is selected from a set of different application containers having different application tips. In particular, a variety of syringe types (for example with finer needles, with multi-hole needles) and especially different syringe volumes can be used or exchanged for one another with little or no effort. As application container, but also as application tips, it is possible to use a multiplicity of existing commercially available products from the field of pipetting in an extremely wide range of configurations (in respect of material, size, design) which, for the sake of simplicity, are not further differentiated herein.

To achieve optimum spray results, the application tip of the application container is advantageously arranged at a distance of 0.01-5 cm, preferably 0.1-0.5 cm, from an axial main nozzle of the spray head, measured in the main direction of flow of the stream of gas. That distance is dependent, for example, upon the formulation or substance being applied, the type of tip, the ambient temperature, the ambient humidity or the form of spray employed (wide jet, round jet) and it is therefore advantageous if that distance can be varied in order to achieve an optimum or desired spray result.

Advantageously a spray head is used which has two oppositely located horn air nozzles which generate two inwardly directed horn gas streams, the application tip of the application container being arranged in the region of intersection of the two horn gas streams. The additional horn gas streams provide for additional nebulisation and define the shape of the spray result (round jet, wide jet).

During the spraying operation, that is to say while the substrate is being acted upon by the atomised substance, the substrate is advantageously moved in one or two dimensions in a plane aligned transversely with respect to the main direction of flow of the stream of gas. Alternatively, while the substrate is being acted upon by the atomised substance, the spray head and the application container with the application tip are moved in one or two dimensions transversely with respect to the main direction of flow of the stream of gas. The substrate is in that way coated completely and with a uniform layer thickness.

With a view to the best possible spray result, the spray head is advantageously operated at a pressure of 1-10 bar, preferably 3-4 bar, and a gas throughput of 100-1000 l/min, preferably 200-600 l/min.

In accordance with an advantageous development, the application tips of more than one application container are introduced simultaneously or sequentially into the stream of gas L, and the different substances to be sprayed that are contained in the application containers are delivered into the stream of gas L and atomised either in succession or simultaneously.

That form of the spraying process enables, for example, a plurality of different paint formulations F to be sprayed either immediately one after the other or even simultaneously, thus allowing intermixing of the different paint mists FN. This would be an advantage, for example, for the application of two-component systems, but it would in that way also be possible for a solvent or some other auxiliary substance to be added to the spray mist in addition to the paint formulation F, for example in order to compensate for the evaporation of the solvents contained in the paint formulation at high ambient temperatures.

In respect of the spray device, the core of the invention lies in the following: a spray device for carrying out the spraying process according to the invention comprises a spray head for generating a stream of gas that acts upon the substrate and an application container equipped with an application tip for holding a substance to be atomised in the stream of gas. The spray device further comprises a robot, preferably a multi-axis robot, for picking up the application container from a storage container and for introducing the application tip of the application container picked up into the spray jet generated by the spray head transversely with respect to the main direction of flow of the stream of gas at a position outside the spray head and at a distance therefrom.

In the context of this invention, a robot, especially a multi-axis robot, is to be understood as being any kind of motor-driven, electrically or electronically controlled manipulation means equipped with gripping mechanisms which, in a controlled way, are able to grip articles and move them in at least two spatial directions.

The spray device advantageously also comprises discharge means for discharging the substance contained in the application container from the application container into the stream of gas generated by the spray head.

Advantageously the robot is configured to remove a partly or fully emptied application container from the stream of gas after use and preferably throw it into a waste container.

The spray device is advantageously configured to adjust the distance between the spray head and the application tip and/or the distance between the application tip and the substrate automatically or manually. This allows adaptation to an extremely wide range of operating conditions and optimisation of the spray pattern on the substrate.

The spray device is advantageously configured for sequential or simultaneous introduction of the application tips of two or more application containers into the stream of gas. This allows sequential or simultaneous nebulisation of two or more substances.

Advantageously the application container is a disposable syringe or a disposable pipette which can be disposed of after use and need not be cleaned.

Advantageously the application tip is straight and an outlet opening of the application tip opens into the stream of gas at a right-angle, so that the substance to be applied is introducible into the stream of gas at a right-angle to the main direction of flow thereof.

In a variant that is likewise advantageous, the application tip is straight and has at least one lateral outlet opening through which the substance to be applied is introducible into the stream of gas. The substance to be applied is thus introducible into the stream of gas in the main direction of flow thereof.

In an alternative advantageous variant, the application tip is bent at an angle and an outlet opening of the application tip opens in the direction of the stream of gas, so that the substance to be applied is introducible into the stream of gas parallel to the main direction of flow thereof.

The robot is advantageously configured to move the spray head together with the application container in at least one dimension transversely with respect to the main direction of flow of the stream of gas. It is thus possible to achieve uniform application to the substrate over the entire area thereof to be sprayed.

Alternatively or in addition, the spray device has a second robot for holding a substrate and for moving the substrate in at least one direction transversely with respect to the main direction of flow of the stream of gas. This likewise makes it possible to achieve uniform application to the substrate over the entire area thereof to be sprayed.

The spray device advantageously comprises an electronic controller for the robot and, where applicable, for the second robot, for discharge means for discharging substance contained in the application container from the application container and for supplying gas to the spray head, the controller being programmed so that it can autonomously control the workflows necessary for carrying out the spraying process. In this way the spray device is able to operate automatically.

In an advantageous embodiment, the electronic controller is programmed so that it iteratively optimises the workflows and parameters necessary for carrying out the spraying process. The electronic controller thus provides automated optimisation of the workflows and especially the parameters that affect the spray pattern, especially the speed of the stream of gas, metering speed of the substance discharge, distances between the spray head, the application tip and the substrate, horn gas flow, etc. For that purpose, after a first spraying operation the sprayed substrate is tested in a suitable analysis device, for example in respect of the colour and homogeneity of the paint layer, etc., then the spraying operation is repeated with one or more modified parameters, the new substrate is likewise tested and, by comparing the results of the first and subsequent tests, a decision is made as to whether the modification of the parameters has led to an improvement or a deterioration in the spray result. It is thus possible for the optimum parameters for the spraying to operation to be automatically determined iteratively over a plurality of spraying operations and subsequent testing of the spray results. In detail, such an iterative optimisation process could look like this:

1) Spraying of a substance, for example paint, onto a substrate using a parameter set A.
2) Analysis of the substrate for inhomogeneities in an analysis device, the analysis device detecting, for example, inhomogeneities, e.g. in the form of small bubbles on the paint surface.
3) The spraying process is repeated, but using a parameter set B that has been slightly modified in comparison with parameter set A by the software of the control computer, for example in which the intensity of the stream of gas has been slightly reduced.
4) The analysis is repeated and, for example, already shows a lower level of bubble formation.
5) A further spraying operation is carried out, using a parameter set C that has likewise been adapted by the software of the control computer (for example in this case with a slight reduction in the speed of discharge of the paint into the stream of gas).
6) A further analysis of the new spray result now shows, for example, that the sprayed-on paint layer no longer exhibits any inhomogeneities.
7) The software of the electronic controller stores the optimised parameter set C and uses it for further spraying operations.

BRIEF DESCRIPTION OF THE DRAWINGS

The invention is described in greater detail below with reference to exemplary embodiments shown in the drawings, wherein:

FIG. 1a-1d—are a diagrammatic representation of an exemplary embodiment of the spraying process according to the invention, FIG. 2a-2d—are a side view, a plan view, a front view and a sectional view of a spray head suitable for the spraying process according to the invention, FIG. 3—is a diagrammatic side view of an exemplary embodiment of the spray device according to the invention in the non-operating state, FIG. 4—is a plan view of the spray device of FIG. 3 in a state in which it is ready for the spraying operation, FIG. 5—is a side view analogous to FIG. 3 of the spray device during a spraying operation, FIG. 6—is a diagram illustrating the movement of a substrate relative to the spray head, FIG. 7a-b—are diagrams showing two possible forms of application tips and FIG. 8—shows the spray device in an exemplary embodiment that has been slightly modified in comparison with the exemplary embodiment according to FIG. 5.

DETAILED DESCRIPTION

Figure 4:
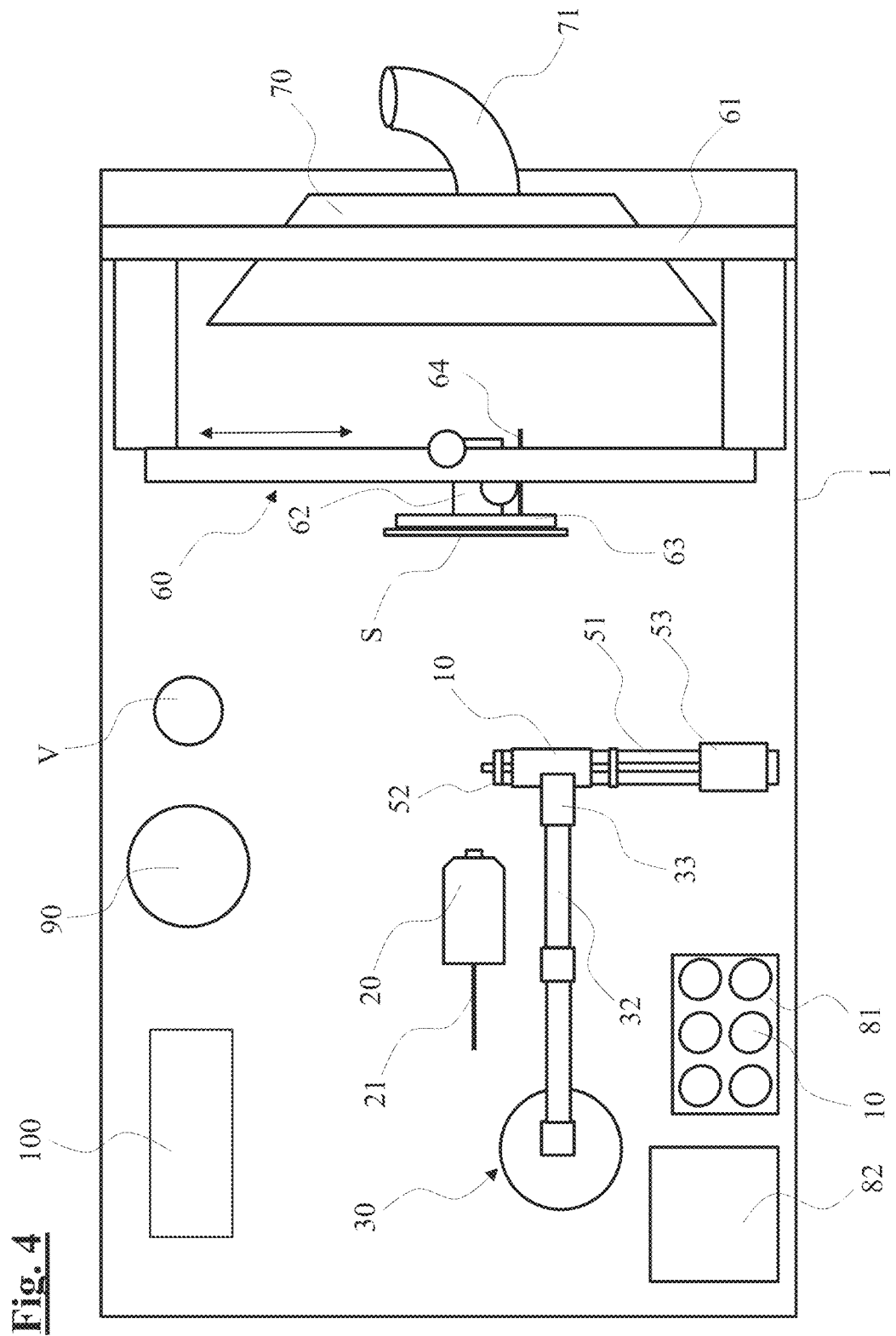
Figure 5:
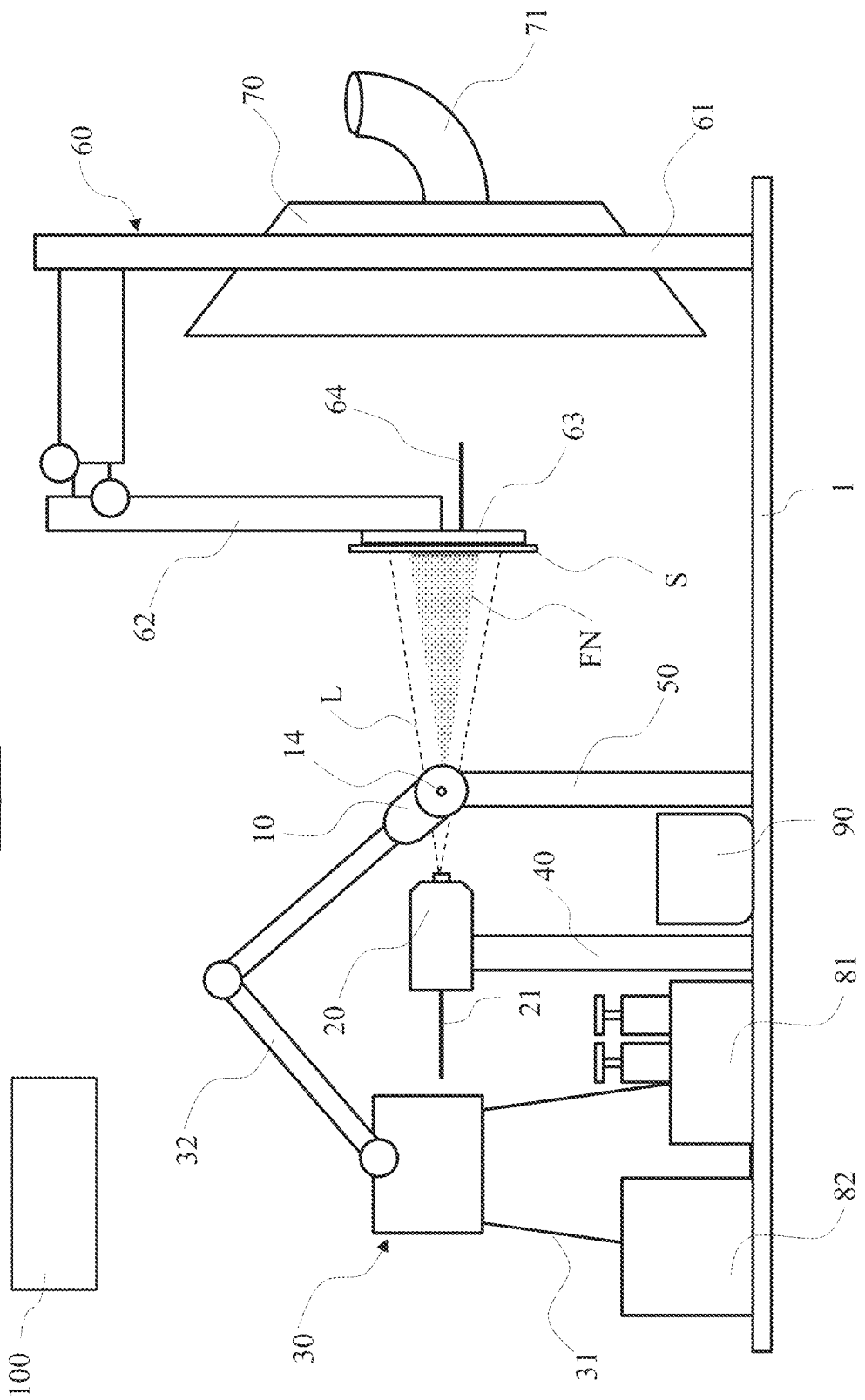
Figure 7A:
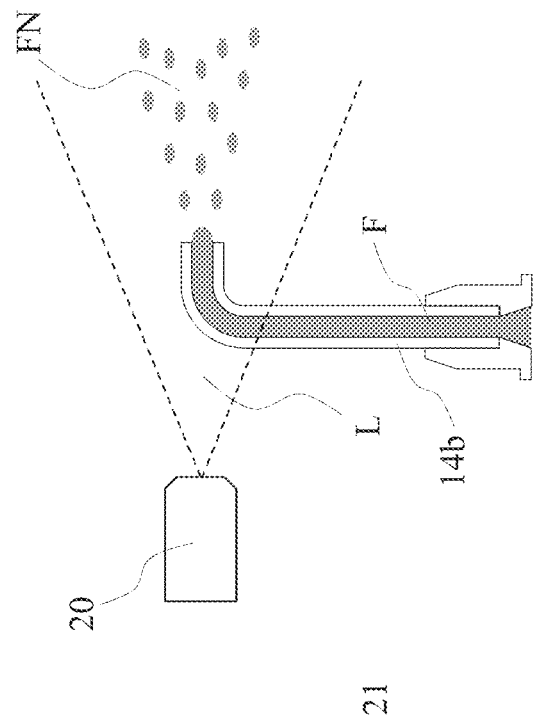
Figure 7B:
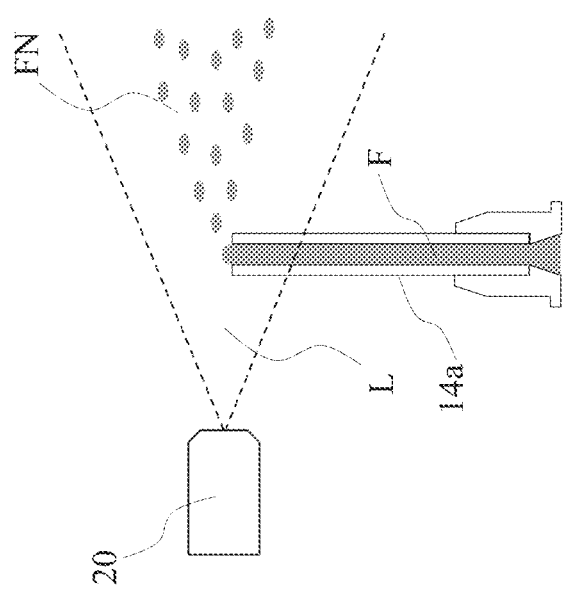
Figure 8:
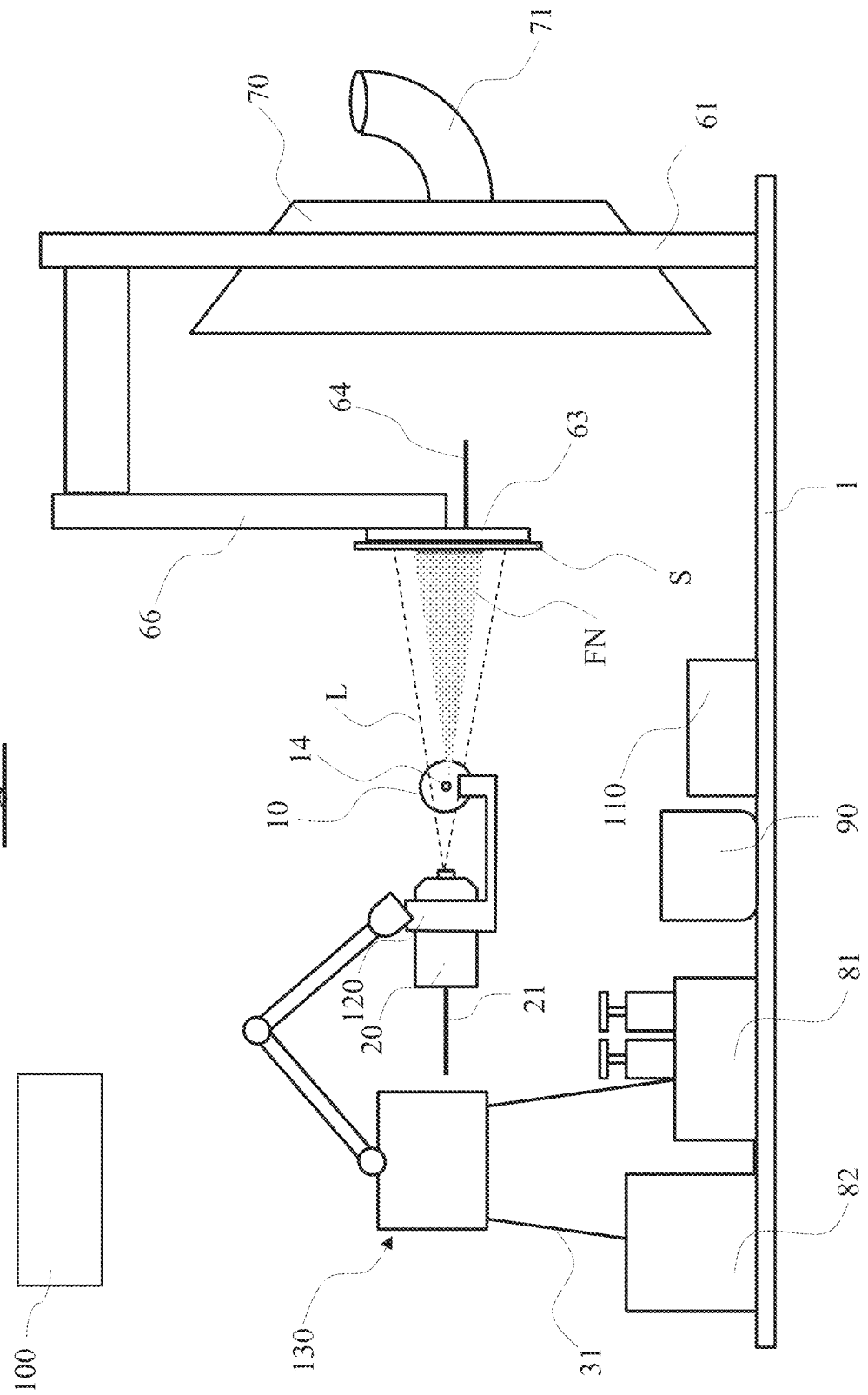

The following observations apply in respect of the description which follows: where, for the purpose of clarity of the drawings, reference signs are included in a Figure but are not mentioned in the directly associated part of the description, reference should be made to the explanation of those reference signs in the preceding or subsequent parts of the description. Conversely, to avoid overcomplication of the drawings, reference signs that are less relevant for immediate understanding are not included in all Figures. In that case, reference should be made to the other Figures.

Hereinbelow the invention is described purely by way of example in connection with the spray application of a liquid paint formulation to a substrate. It will be understood, however, that the process according to the invention and the corresponding device according to the invention are in principle also suitable for the spray application of substances other than paint formulations or adhesives and adhesive formulations, provided the substances in question are suitable for atomisation or nebulisation (aerosol formation) in a stream of air or, more generally, gas. As well as liquid substances, in principle substances in powder form also come into consideration for spray application.

Compressed air is normally used for atomisation or nebulisation of the substance, but it is also possible to use any other gas or gaseous mixture for that purpose. For the sake of simplicity the following explanation is confined to a paint formulation as the substance being applied and (compressed) air as the gaseous mixture used for the nebulisation or atomisation of the substance.

FIGS. 1a-1d show the typical steps of the spraying process according to the invention.

A substance to be applied here in the example a liquid paint formulation F is held in readiness in a storage container V (FIG. 1a). A desired (relatively small) amount of the paint formulation F is drawn up from the storage container V into an application container 10 (FIG. 1b). The application container 10 is syringe-like and has a chamber 11, a plunger 12 axially displaceable therein, a plunger rod 13 and an application tip 14. In practice, a commercially available disposable syringe or a (plunger) pipette is advantageously used as application container 10. The application tip 14 is advantageously configured as a commercially available metering needle or cannula.

Those two preparative steps just described can also take place outside the actual spraying process, with a desired number of application containers 10 being provided that have different contents or the same contents, as the case may be.

For the spraying process, a spray head 20 is used to generate a substantially conical stream of air (or generally a stream of gas) L, the spray head 20 being arranged in front of and at a distance from a (flat) substrate S to be sprayed so that the stream of air L acts upon the substrate S (FIG. 1*c*). During operation, the spray head 20 is connected to a compressed air source (not shown) via a supply line 21. The pressure of the compressed air is, for example, 3-4 bar; the air throughflow rate is, for example, 200-600 l/min.

The application tip 14 of the application container 10 is introduced laterally into the stream of air L generated by the spray head 20, that is to say transversely with respect to the main direction of flow of the stream of air L, so that the free end (the outlet opening) of the application tip 14 is located approximately centrally (axially) in the stream of air L at a relatively small axial distance ds (FIG. 2*d*) from the spray head 20.

By axial displacement of the plunger 12 in the chamber 11 of the application container 10, paint formulation F is introduced from the application container 10 into the stream of air L, where it is atomised. The spray mist consisting of the mixture of air and extremely small paint droplets is indicated by FN in FIG. 1*d*. The spray mist FN acts upon the substrate S and produces a patch of coating FS thereon.

The outlet opening of the application tip 14 of the application container 10 must be sufficiently small to deliver very fine droplets of the paint formulation F into the stream of air L. The distance ds of the application tip 14 from the spray head 20, or rather the main nozzle 24 thereof, is only a few millimetres, typically about 0.01-5 cm. The application tip 14 can be straight, as shown as 14*a* in FIG. 7*a*, and project into the stream of air L at a right-angle, so that the outlet opening of the tip is likewise located at a right-angle to the stream of air, or, as shown in FIG. 7*b*, is in the form of a curved application tip 14*b* in which the front portion of the tip is bent over so that the outlet opening of the tip lies parallel to the stream of air. Alternatively, the application tip can also be provided with one or more lateral outlet openings. It is also possible for the outlet opening of the application tip to open into the stream of air at angles other than a right-angle or parallel to the main direction of flow of the stream of air L.

In order to apply a homogeneous paint layer to the entire area of the substrate S to be sprayed, the substrate S, for example as shown in the diagram in FIG. 6, is moved in one or two directions (horizontally and/or vertically) in its own plane. This can also be advantageous if a coating is to be applied to an area of the substrate S that is larger than can immediately be acted upon by the spray mist FN. A possible travel path of the substrate S is indicated by 65 in FIG. 6. The axial distance between the substrate S and the spray head 20 remains constant, but in an advantageous implementation could also be adjusted during a spraying operation or between a plurality of spraying operations. As an alternative to the movement of the substrate S, it is also possible for the spray head 20 together with the application tip 14 of the application container 10 to be moved in one or two dimensions transversely with respect to the direction of flow of the spray mist FN.

A commercially available spray head can be used as spray head 20. An example of a suitable spray head 20 is shown in FIGS. 2*a*-2*d* in a drawing showing three views (FIGS. 2*a*-*c*) and a sectional view (FIG. 2*d*).

The spray head 20 has a housing 22, at one end of which there is arranged an inlet 23 for the connection of the compressed air supply line 21 (FIG. 1*c*). At the other end of the housing there are arranged an axial main nozzle 24 and two diametrically opposite horn air nozzles (or, generally, horn gas nozzles) 25. The axial main nozzle 24 and the two horn air nozzles 25 are in communicating connection with the inlet 23 via ducts 26 and 27, respectively, provided in the housing 22. The main nozzle 24 and the two horn air nozzles 25 together generate the afore-mentioned, substantially conical air jet L which, as a result of the inwardly directed, advantageously adjustable horn air streams (or, generally, horn gas streams) generated by the two horn air nozzles 25, can be varied in shape between a wide jet and a round jet.

It would also be possible to use as spray head 20 a commercially available spray head having (a) feed opening(s) for the substance to be sprayed, in which case, however, its feed opening(s) for substance to be sprayed would be inactive or closed, that is to say the spray head would serve only for generating the stream of gas.

FIGS. 3-5 show an exemplary embodiment of a complete spray device which is suitable for carrying out the spraying process according to the invention fully automatically.

The spray device is constructed on a base plate 1. On the base plate 1 there are arranged a first multi-axis robot 30, a holder 40 for the spray head 20, a holder 50 for an application container 10, a second multi-axis robot 60 and a spray chamber 70. Also located on the base plate 1 are a magazine 81 for a supply of application containers 10, a waste container 82 for empty or discarded application containers 10 and a collecting container 90 for receiving finished sprayed substrates S.

The first (multi-axis) robot 30 constructed on a mounting frame 31 comprises as main element a multi-axis robot arm 32, on the foremost end of which there is arranged a gripping mechanism 33 for taking hold of an application container 10. The holder 40 is essentially a pedestal. The spray head 20 is mounted at its upper end. The spray head is (during operation of the device) connected to a compressed air source (not shown) via the supply line 21. The holder 50 is likewise essentially a pedestal, at the upper end of which there are arranged a receiving device 51 and a guide 52 (FIG. 4) for an application container 10. On the holder 50 there is also arranged a drive device 53 for the plunger 12 of an inserted application container 10 (FIG. 4). This drive device can be an advancing drive, as known, for example, from fully automatic pipetting systems. The plunger 12, the plunger rod 13 and the drive device 53 together form discharge means for discharging the substance located in the application container 10 into the stream of gas L.

The second multi-axis robot 60, which is likewise constructed on a mounting frame 61, comprises as main element a robot arm 62 which, similarly to an XY table, can be moved vertically (perpendicular to the base plate 1) and horizontally (perpendicular to the plane of the drawing). At the free end of the robot arm 62 there is arranged a holding device 63 for a substrate S to be coated. The holding device 63 can be, for example, in the form of a vacuum holding device which (during operation) is connected to a vacuum source or source of reduced pressure (not shown) via a line 64.

The spray chamber 70 forms an extractor for stray spray mist, i.e. spray mist bypassing the substrate, which is advantageously provided with a filter and is connected to a suction device (not shown) via a suction tube 71.

The relative arrangement of the described components of the spray device can be seen clearly from FIG. 3 (side view) and FIG. 4 (view from above).

The spray device further comprises an electronic controller 100 which actuates the two multi-axis robots 30 and 60, the drive device 53 for advancing the plunger 12 of the application container, as well as the necessary valves (vacuum, spray head control). The controller 100 need not necessarily be arranged on the base plate 1, but can also be realised, for example, by an appropriately connected external computer. The controller 100 can also be configured so that, by means of adjusting means (not shown herein), it adjusts the distance between the application tip of the application container and the spray head and optionally also the distance between the application tip of the application container and the substrate, either as a result of a manual command or automatically on the basis of, for example, an analysis of the spray pattern on the substrate.

FIG. 3 shows the spray device in the non-operating configuration. The magazine 81 holds a number of pre-filled application containers 10. A substrate S to be sprayed is held in place on the holding device 63 of the second multi-axis robot 60.

The mode of operation of the spray device is as follows, all the workflows being initiated and controlled by the controller 100:

In response to the start command of the controller 100, the arm 32 of the first multi-axis robot 30 is moved over the magazine 81 and with its gripping mechanism 33 picks up an application container 10 held in readiness therein. The application container 10 is then moved by the multi-axis robot 30 to the storage container V and the tip of the application container is dipped into the paint formulation F. Here a desired (relatively small) amount of the paint formulation F is sucked into the application container 10 by withdrawal of the plunger 13 (see FIG. 1*b*). The arm 32 of the multi-axis robot 30 then moves over the holder 50 and travels with the application container 10 into the receiving device 51 and guide 52 of the holder (FIG. 4). As described in connection with FIGS. 1*c* and 1*d*, the tip 14 of the application container 10 is located in front of the spray head 20 and at an axial distance therefrom essentially approximately in the centre of the stream of air L generated by the spray head 20. Advantageously the distance between the spray head 20 and the application tip 14 can be altered automatically during the spraying operation or manually between individual spraying operations in such a way that the spray pattern (affects patch of coating FS) can be adjusted in respect of size and paint mist density.

Once the spray head 20 has been activated and the said stream of air is stable, the drive device 53 on the holder 50 displaces the plunger 12 of the application container 10, the paint formulation F located in the application container 10 gradually being introduced from the latter into the stream of air L and, by its atomisation, forming a paint formulation mist FN which in turn acts upon the substrate S (FIG. 5). The movement of the plunger 12 of the application container 10 can alternatively also be effected by the first multi-axis robot 30 by means of its gripping mechanism 33. The speed with which the paint formulation F is delivered into the stream of air L, and/or the stream of air itself (amount of air, air speed), can be varied in order to alter the spray pattern.

If necessary, during the spraying operation the substrate S can be moved up and down as well as back and forth by means of the second multi-axis robot 60, as shown in the diagram in FIG. 6. Advantageously, the distance between the application tip 14 and the substrate S can be altered during the spraying operation or manually between individual spraying operations in such a way that the spray pattern (affects patch of coating FS) can be adjusted in respect of size and spray mist density.

After the end of the spraying operation, the application container 10 is thrown into the waste container 82 by means of the first multi-axis robot 30. The finished sprayed substrate S is then deposited in the collecting container 90. This too can be effected, for example, by means of the first multi-axis robot 30 insofar as it is equipped with suitable mechanisms for taking hold of the substrate.

If necessary, the described workflows are repeated with a fresh substrate and a fresh application container.

As shown in FIG. 8, a further advantageous embodiment of the spray device according to the invention has, instead of the first and second robots, a single multi-function robot 130 which assumes the functions of those two robots: the multi-function robot 130 picks up, for example, the application container 10 with the application tip 14 and fixes them in a spraying tool 120, which is stored on a parking station 110, can be picked up by the multi-function robot and has an inbuilt spray head 20 and an application container holder 51 including the drive 53 (the latter two components not being shown in FIG. 8 for clarity of the drawing), then picks up that spraying tool 120 and, during the spraying operation, moves it along a substrate S which is fixedly mounted on a substrate holder 66 (see also FIG. 6).

In a further embodiment, not shown in the drawings, the spray device is configured to introduce the application tips 14 of more than one application container 10 simultaneously or sequentially into the stream of air L of the spray head 20. This enables a plurality of different paint formulations F to be sprayed either immediately one after the other or even simultaneously, thus allowing intermixing of the different paint mists FN. This is an advantage, for example, for the application of two-component systems, but it would in that way also be possible for a solvent or some other auxiliary substance to be added to the spray mist in addition to the paint formulation F, for example in order to compensate for the evaporation of the solvents contained in the paint formulation at high ambient temperatures.

The invention claimed is:

1. A spraying process for coating a substrate with a substance atomised in a stream of gas, wherein a spray head is used to generate a stream of gas that acts upon the substrate, and wherein the substance is present in an application container equipped with an application tip and, without contact with the spray head, is introduced from the application container into the stream of gas and thereby atomised, wherein the application tip of the application container containing the substance is introduced into the stream of gas outside the spray head at a distance therefrom and transversely with respect to a main direction of flow of the stream of gas, and the substance is introduced into the stream of gas at that distance, wherein a disposable syringe or a disposable pipette is used as the application container.

2. The spraying process according to claim 1, wherein the application container with the application tip is selected from a set of different application containers having different application tips.

3. The spraying process according to claim 1, wherein the application tip of the application container is arranged at a distance of 0.01-5 cm from an axial main nozzle of the spray head, measured in the main direction of flow of the stream of gas.

4. The spraying process according to claim 1, wherein a spray head is used which has two oppositely located horn air nozzles which generate two inwardly directed horn gas streams, and the application tip of the application container is arranged in a region of intersection of the two horn gas streams.

5. The spraying process according to claim 1, wherein the substrate, while being acted upon by the atomised substance, is moved in one or two dimensions transversely with respect to the main direction of flow of the stream of gas.

6. The spraying process according to claim 1, wherein, while the substrate is being acted upon by the atomised substance, the spray head and the application container with the application tip are moved in one or two dimensions transversely with respect to the main direction of flow of the stream of gas.

7. The spraying process according to claim 1, wherein the spray head is operated at a pressure of 1-10 bar and a gas throughput of 100-1000 l/min.

8. The spraying process according to claim 1, wherein the application tips of more than one application container are introduced simultaneously or sequentially into the stream of gas, and different substances to be sprayed that are contained in the application containers are delivered into the stream of gas and atomised either in succession or simultaneously.

9. A spray device for carrying out the spraying process according to claim 1, comprising
 a spray head for generating a stream of gas that acts upon the substrate;
 an application container equipped with an application tip for holding a substance to be atomised in the stream of gas; and
 a robot for picking up the application container from a storage container and for introducing the application tip into the stream of gas, wherein the application container is a disposable syringe or disposable pipette.

10. The spray device according to claim 9, further comprising a discharger configured to discharge the substance contained in the application container from the application container into the stream of gas generated by the spray head.

11. The spray device according to claim 9, wherein the robot is configured to remove a partly or fully emptied application container from the stream of gas.

12. The spray device according to claim 9, wherein the spray device is configured to adjust the distance between the spray head and the application tip and/or the distance between the application tip and the substrate automatically or manually.

13. The spray device according to claim 9, wherein the spray device is configured for sequential or simultaneous introduction of application tips of two or more application containers into the stream of gas.

14. The spray device according to claim 9, wherein the application tip is straight and an outlet opening of the application tip opens into the stream of gas at a right-angle, so that the substance to be applied is introducible into the stream of gas at a right-angle to the main direction of flow thereof.

15. The spray device according to claim 9, wherein the application tip is straight and has at least one lateral outlet opening through which the substance to be applied is introducible into the stream of gas.

16. The spray device according to claim 9, wherein the application tip is bent at an angle and an outlet opening of the application tip opens in the direction of the stream of gas, so that the substance to be applied is introducible into the stream of gas parallel to the main direction of flow thereof.

17. The spray device according to claim 9, wherein the robot is configured to move the spray head together with the application container in at least one dimension transversely with respect to the main direction of flow of the stream of gas.

18. The spray device according to claim 9, further comprising a second robot for holding a substrate and for moving the substrate in at least one direction transversely with respect to the main direction of flow of the stream of gas.

19. The spray device according to claim 9, further comprising an electronic controller for the robot, for a second robot for holding a substrate, for a discharger for discharging the substance contained in the application container from the application container, and/or for supplying gas to the spray head, the controller being programmed to autonomously control workflows necessary for carrying out the spraying process.

20. The spray device according to claim 19, wherein the electronic controller is programmed so that it iteratively optimises parameters and the workflows necessary for carrying out the spraying process.

* * * * *

UNITED STATES PATENT AND TRADEMARK OFFICE
CERTIFICATE OF CORRECTION

| | |
|---|---|
| PATENT NO. | : 11,241,704 B2 |
| APPLICATION NO. | : 16/344940 |
| DATED | : February 8, 2022 |
| INVENTOR(S) | : Rolf Gueller et al. |

It is certified that error appears in the above-identified patent and that said Letters Patent is hereby corrected as shown below:

In the Claims

Column 11, Line 39, Claim 7, delete "100-10001/min." and insert -- 100-1000 l/min. --

Signed and Sealed this
Twenty-sixth Day of April, 2022

*Katherine Kelly Vidal*

Katherine Kelly Vidal
*Director of the United States Patent and Trademark Office*